Aug. 1, 1950  F. J. KENT  2,517,214
OSCILLATORY ELECTRIC MOTOR
Filed Feb. 18, 1948
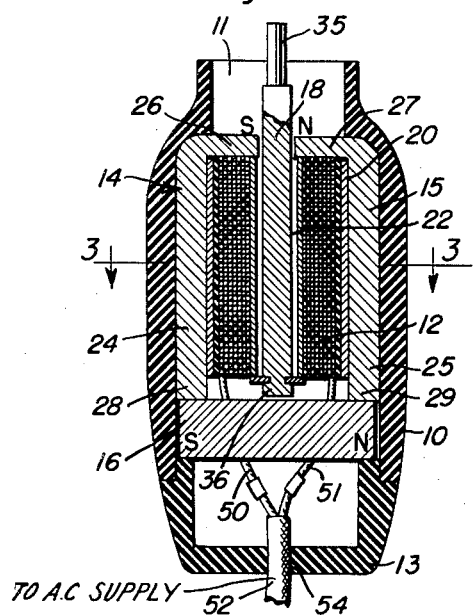
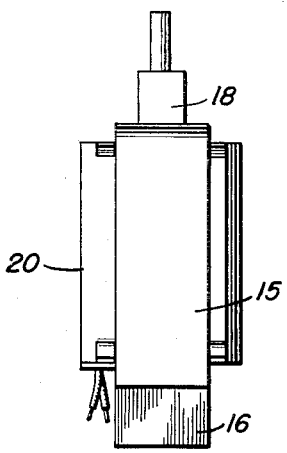
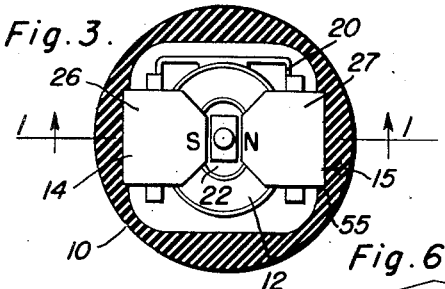
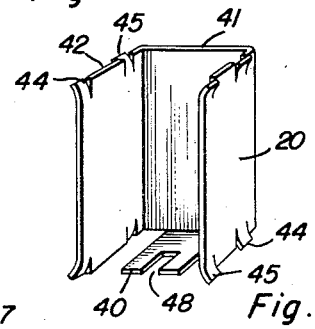
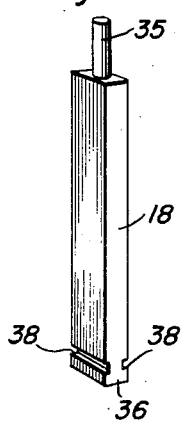
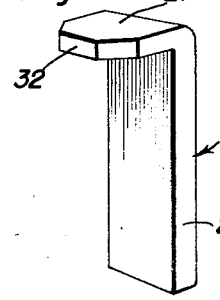
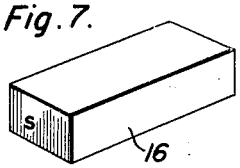
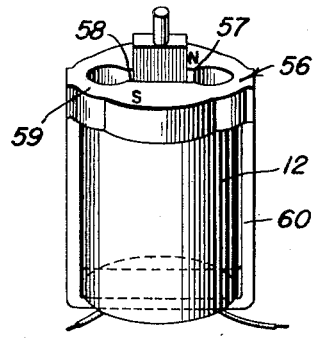
Frederick J. Kent
INVENTOR.

Patented Aug. 1, 1950

2,517,214

UNITED STATES PATENT OFFICE 2,517,214

OSCILLATORY ELECTRIC MOTOR

Frederick J. Kent, Glen Rock, N. J., assignor to Kent Laboratories, Incorporated, Fair Lawn, N. J., a corporation of New Jersey Application February 18, 1948, Serial No. 9,180

7 Claims. (Cl. 172—126)

This invention relates to electric motors of the type adapted to produce an oscillatory movement of the armature such as used, for instance, for driving the rapidly reciprocating blade of razors, the tool of a dentist and similar apparatus usually held in the hand.

Various types of oscillatory armature motors are in use or have been designed, most of which either include an armature consisting of or embodying an elastic vibrating reed or are operated by springs attached to it. Such elastic members have to be designed for or to be adjusted to a fundamental vibratory frequency equal to the frequency of the alternating current by means of which they are oscillated, in order to keep the driving energy at a minimum, this requirement being vital in tools held in the hand in order to keep the development of heat at a low value. Springs or reeds adjusted to a frequency higher than the frequency of the alternating current require a much stronger magnetic flux and in consequence thereof a large input of energy a substantial portion of which is converted into heat. The springs, however, having a fundamental frequency equal to that of the circuit driving them, cease to operate properly when variations in the elastic properties or of the load occur and in such a case the delivery of power ceases or is curtailed.

The oscillatory armatures above mentioned and other armatures requiring relatively high power inputs, have also to be constructed with high precision in order to secure a high efficiency and are therefore costly.

It is therefore the main object of this invention to provide a motor with an oscillatory armature which is not based on any spring action or on the action of any other member tuned or adjusted to a certain well defined frequency.

It is a further object of the invention to provide a motor of the above named type operating with a minimum of input energy, in which the amount of heat produced during operation is small and does not produce any inconvenience or discomfort to the person holding the tool driven by said motor.

It is a further object of the invention to provide a motor of the above type which does not require a great precision in manufacturing or in adjusting in order to be operable with a small amount of input energy and which may therefore be manufactured at low cost.

It is a further object of the invention to provide spacing and holding means within the casing but unconnected therewith which holds the parts inserted into the casing in accurate operative position without special fixation means.

Further and more specific objects will be apparent from the following detailed specification describing the invention.

The inventive concept may be embodied in different constructions, but in order to explain the principle of the invention and the preferred modes of applying said principle two embodiments have been shown in the drawing by way of example. It is to be understood that no survey of possible further embodiments, some of which will be obvious to the expert skilled in this art, will be given. Modifications of the example shown, embodying the same principle, are therefore not necessarily departures from the invention.

In the accompanying drawing:

Figure 1 is an elevational sectional view of the motor with an oscillating armature, constructed according to this invention, the section being taken along line 1—1 in Figure 3.

Figure 2 is an elevational view of the structure contained within the casing the latter being removed.

Figure 3 is a sectional plan view of the arrangement shown in Figure 1 the section being taken along line 3—3 of Figure 1.

Figures 4–7 are isometric views of details.

Figure 8 is a perspective view of a modified arrangement.

The oscillating motor is shown as being enclosed within a suitable casing 10 so shaped that it may serve as a handle for a tool which is not shown. This casing is shown as open on the top, but it is to be understood that this is the end of the casing where the tool head has to be mounted and that the opening 11 of the casing is completely closed by the tool head, for instance by the razor head. The closure may be water- and moistureproof. If such a seal can be applied the motor may be permanently sealed in, as neither lubrication nor any other operation requiring access to the motor is necessary during the lifetime of the unit. The other end of casing 10 is sealed by cap 13.

The motor essentially comprises a coil 12, pole pieces 14 and 15, a permanent magnet 16, the armature 18 and a frame 20 holding said members.

In the example shown in Figure 1 of the drawing the coil 12 has the shape of an elongated cylinder surrounding an elongated or elliptical central opening 22. On both sides of the coil the pole pieces 14, 15 are placed on the outside, these pieces consisting of straight longitudinal sections 24, 25 which are bent at one of their ends, The bent sections 26, 27 are convergent and are tapering towards the free ends 32 forming the poles and facing the armature, so as to concentrate the magnetic flux passing through the pole pieces to the armature.

The longitudinal sections 24, 25 run along the two flat sides of the coil 12 in closest proximity to the same from one end to the other. One end 28, 29 of the straight sections of the pole pieces 14, 15 projects somewhat beyond, the end of the coil, while the bent sections 26 on the other end are located directly above the coil and face each other across and above the central elongated opening 22 of the same.

A permanent magnet 16 is laid across and abutting against the two projecting ends 28, 29 of the pole pieces, which is preferably made of an aluminum nickel alloy or of one of the cobalt alloys, while the pole pieces are preferably made of soft ingot iron so that they will merely carry the magnetic flux, without being themselves magnetized.

The armature 18 (Figure 3) consists of a piece of soft ingot iron passing through the central opening 22 of the coil. One of its ends projecting beyond the pole pieces carries the impeller 35 which is connected with or joined to the moving tool (not shown) while the second end 36 projects beyond the coil into the immediate vicinity of the permanent magnet 16.

Near this end the armature is provided with two grooves 38 for a purpose to be described below.

The motor forms a unit, all the elements of which with the exception of the permanent magnet are held fixedly and in operative position with respect to each other by the frame 20. This frame is of U-shape in cross section having a rear wall 41 and wings 42 and is provided with a partially slotted fork like tongue 40 on the open bottom side which projects from the rear wall 41. It is made of a non-magnetic metal.

The upper and lower edges of the wings 41 and 42 are provided with outwardly projecting lugs 44, 45, produced by slitting the edge and bending the slitted portions. These lugs are arranged at such a distance that the pole pieces 14, 15 are snugly fitting into the space between the lugs and are held against transverse movement.

The forked tongue 40 is used to hold the armature 18 which is inserted with its grooved portion 38 into the slot 48 of the tongue. It is preferable in many cases to make the grooves fit the tongue completely, so that during the oscillatory movement a certain torsional stress will be set up in the tongue. Such a torsional stress is preferable to play which would wear out the armature.

The coil wires 50, 51 are led to a cable 52 which passes through a hole 54 in the cap 13 to the outside.

The operation of the oscillating motor will be clear from the foregoing description. Assuming the motor to have been assembled, in the manner described below, and further assuming that the cable is connected with a source of A. C. the coil 12 will be energized thus causing a magnetic flux to be generated alternately in the pole pieces and armature in one or the other direction. Attention may first be called to the fact that the permanent magnet 16 has set up a magnetic field which traverses the pole pieces. But no appreciable magnetic flux is set up in the armature as long as the coil is not energized, as the end 36 of the armature is close to the neutral or middle zone of the magnet and the mean effect of any field entering at this point on the field produced by the magnet and passing through the pole pieces will be zero.

When the coil is energized, a field is set up traversing longitudinally the armature 18 which branches out when reaching the permanent magnet and closes through the pole pieces leading to the other end of the armature. Whatever direction of the field is assumed, it will reinforce the magnetic field on one side of the magnet 16 and neutralize wholly or partly the magnetic field on the other side. The polarity of the field passing through the armature will be reversed with each cycle fluctuation. Therefore the side on which the magnetic flux has been reinforced will now attract the armature against the action of a reduced magnetic flux on the other side. The armature will therefore start to oscillate solely under the influence of the magnetic forces varying with the fluctuations of the alternating current.

A main point of the motor construction is the easy assembly not requiring any mechanical means.

Suitable dimensions of the parts and two grooves 38 in the cases locating the pole pieces are solely required for producing a perfect fixation and holding of all the parts.

To assemble the parts the armature is slid into its place on the forked tongue 40 in the slot 48 and rests on said tongue by virtue of the grooves. Then the coil is slipped into its place, resting its central portion on the tongue 40. Then the pole pieces are placed against the outside of the frame 20 so as to be straddled and held by the lugs 44, 45, their bent ends 26, 27 resting upon the upper edge of the frame 20. Then the whole assembly is slipped into the casing 10, the pole pieces entering the grooves 55. Electrical connections of the ends of the coil wires 51, 52 with the cable 52 are made, the permanent magnet 16 is attached and is held by its own magnetic force. Then the cap 13 is mounted which by means of its lower edge holds the permanent magnet 16 and thereby secures the entire unit firmly in its place. The cap is cemented to the casing and seals the unit permanently within the same.

In the modification shown in Figure 8 the permanent magnet 56 has been placed on top of the coil. This magnet may have two inwardly projecting poles 57, 58 facing the gap with an arcuate bridge piece 59 joining said poles. These bridge pieces are joined by a yoke 60 reaching around the coil.

In all other respects the construction is similar to that already described. It will however be noted that the magnet structure 56, 59, 60 now has its neutral zone at the end of the coil where the armature 18 has its fixed point.

It will thus be seen that the motor unit above described furnishes a vibrating motor without springs which can be manufactured at very low cost and can be assembled without special fixation means and without the use of special skill.

It will be clear that the specific construction of the details, as indicated, is not essential and that changes in this construction will not affect the principle of the invention.

Having described the invention, what is claimed as new is:

1. An electric motor of the oscillatory type comprising an oscillatory armature of magnetically permeable material, held near one end for free and mechanically unrestrained oscillatory movement at the other end, two pole pieces arranged symmetrically and in substantial parallelism with respect to said armature, said pole pieces having bent ends directed towards the armature facing each other across a gap and enclosing between them the freely oscillating end of the armature, a linear permanent magnet, substantially joining said pole pieces, and said armature arranged transversely with respect to said armature and pole pieces with its poles in contact with pole pieces and with its neutral zone in operative flux conducting relation with the fixed end of said armature, a coil with an elongated hollow interior space encircling the armature arranged in the space between the latter and the pole pieces, a source of alternating currents for energizing said coil, said coil producing an alternating flux in the armature entering the permanent magnet and closed through one of the pole pieces.

2. An oscillatory electric motor comprising, a casing, an oscillating armature, a permanent magnet, arranged transversely with respect to said armature with its neutral zone facing the end of the armature, the latter being in operative flux conducting relation with respect to the magnet, two poles pieces joined at one end by said permanent magnet and arranged in substantial parallelism with said armature and symmetrically thereto said pole pieces having bent ends facing each other across a gap, with the armature projecting into said gap, a coil surrounding said armature and a frame supporting said parts in operative relation to each other, said frame having a U-shaped body and a slotted tongue, the former encircling the coil, the latter supporting it and supporting the armature near its end, facing the permanent magnet for free oscillation.

3. An oscillatory electric motor as claimed in claim 2 wherein the armature is provided at one end with parallel grooves and is fitting into the slot of the slotted tongue.

4. An oscillatory electric motor as claimed in claim 2 wherein the side walls of the frame are provided with lugs spaced so as to receive the pole pieces between them, in order to fix their position relatively to the armature and coil.

5. An oscillatory motor comprising an elongated outer casing, an oscillating armature, a permanent magnet arranged transversely and at a right angle to the armature, a yoke joined to said permanent magnet, having sections extending at a substantially right angle to the permanent magnet and in substantial parallelism to the armature and further sections projecting toward the said armature, forming pole pieces facing each other across a gap through which said armature projects, a coil encircling said armature, a frame provided with a slotted tongue encircling the coil, said tongue supporting the armature for free oscillation near one end held in proximity to the neutral zone of the permanent magnet, said end facing the magnet across a gap in operative flux conducting relation to the said magnet.

6. An oscillatory electric motor, comprising a coil with a hollow interior, a permanent bar magnet arranged transversely with respect to the axis of the coil, pole pieces facing each other across a gap, in operative flux conducting relation to and in contact with the poles of the bar shaped permanent magnet, said pole pieces being substantially parallel to the axis of the coil, and producing a permanent magnetic flux through a closed path formed by said permanent magnet and said pole pieces, and through the said gap, an oscillating armature in flux conducting relationship with the neutral zone of the permanent magnet, arranged transversely with respect to the same, said armature extending from said permanent magnet to the said gap, and producing a further closed magnetic path leading from the permanent maget to the gap and bisecting the first mentioned closed path, means for holding said armature at a point between the permanent magnet and the gap for free oscillation, and means for producing an alternating current within said coil, thus generating an alternating magnetic flux in said armature shunting alternately the magnetic flux from the permanent magnet through one of the pole pieces.

7. An oscillatory electric motor, comprising a coil with a hollow elongated interior space, a linear permanent magnet in the shape of a bar, arranged at substantially right angles with respect to the axis of the coil, pole pieces on both sides of the coil, arranged in substantial parallelism to the coil axis, with ends bent towards each other and facing each other across a gap, located on both sides of the coil axis, said pole pieces being in operative contact and in flux conducting relation with the poles of the permanent magnet, so as to form a closed path for the permanent magnetic flux on both sides of the said gap, an oscillatory elongated armature member of magnetically permeable material arranged substantially at right angles to the linear permanent magnet between the neutral zone of said permanent bar magnet and said gap, extending through the latter with one end and in operative flux conducting relation with the said neutral zone of the permanent magnet with its other end, said armature member passing through and being freely movable within the hollow space in the interior of the coil, means for holding said armature for a substantially free and mechanically unrestrained movement at a point located between said permanent magnet and said coil, a source of alternating current for energizing said coil, said armature, during each phase of an alternating current passing the coil, producing an alternating magnetic flux, along a path bisecting the path of the permanent flux and shunting alternately one section of the path of the permanent magnetic flux.

FREDERICK J. KENT.

REFERENCES CITED

The following references are of record in the file of this patent:

UNITED STATES PATENTS

| Number | Name | Date |
|---|---|---|
| 928,582 | Burlingame | July 20, 1909 |
| 2,400,262 | Quinnell | May 14, 1946 |
| 2,406,216 | Goldberg | Aug. 20, 1946 |

FOREIGN PATENTS

| Number | Country | Date |
|---|---|---|
| 782,294 | France | July 5, 1935 |